(12) United States Patent
Ohta et al.

(10) Patent No.: US 11,851,277 B2
(45) Date of Patent: Dec. 26, 2023

(54) SAMPLE STORAGE DEVICE

(71) Applicant: PHC HOLDINGS CORPORATION, Tokyo (JP)

(72) Inventors: Akihiro Ohta, Saitama (JP); Linxiao Xu, Kanagawa (JP); Naoki Wakabayashi, Gunma (JP)

(73) Assignee: PHC HOLDINGS CORPORATION, Tokyo (JP)

( * ) Notice: Subject to any disclaimer, the term of this patent is extended or adjusted under 35 U.S.C. 154(b) by 273 days.

(21) Appl. No.: 17/488,059

(22) Filed: Sep. 28, 2021

(65) Prior Publication Data
US 2022/0017304 A1    Jan. 20, 2022

Related U.S. Application Data

(63) Continuation of application No. PCT/JP2020/004255, filed on Feb. 5, 2020.

(30) Foreign Application Priority Data

Mar. 28, 2019 (JP) .................................. 2019-062351

(51) Int. Cl.
*B65G 1/137* (2006.01)
*B01L 3/00* (2006.01)

(52) U.S. Cl.
CPC ........ *B65G 1/1371* (2013.01); *B01L 3/50857* (2013.01); *B01L 3/545* (2013.01);
(Continued)

(58) Field of Classification Search
CPC .................. B01L 3/545; A61B 10/0096; A47F 2010/005; G01N 2035/0498; G06Q 10/08
See application file for complete search history.

(56) References Cited

U.S. PATENT DOCUMENTS 8,325,013 B2    12/2012 Gerstel
2002/0190845 A1*    12/2002 Moore ............... G06K 7/10336
340/10.3
(Continued)

FOREIGN PATENT DOCUMENTS

JP    5178746 B2    4/2013

OTHER PUBLICATIONS

International Search Report issued in corresponding International Patent Application No. PCT/JP2020/004255, dated Apr. 21, 2020, with English translation.

*Primary Examiner* — Mirza F Alam
(74) *Attorney, Agent, or Firm* — Rimon P.C.

(57) ABSTRACT

A sample storage device may include: a storage chamber; paired rail sections separated in separating direction and extending in an extending direction; an antenna array substrate extending between the rail sections and having antennas; paired slide sections separated from each other in the separating direction and disposed at a position opposite to the antenna array substrate with respect to the rail sections and, so as to be slidable in the extending direction relative to the rail sections, respectively; a support plate transparent to radio waves, extending between the slide sections; and a storage box containable a plurality of containers each holding a sample and a radio tag, the storage box to be set on the support plate such that radio waves can be transmitted between the radio tag and corresponding one of the plurality of antennas.

5 Claims, 9 Drawing Sheets

(52) U.S. Cl.
CPC ... *B01L 2300/022* (2013.01); *B01L 2300/023* (2013.01); *B65G 2203/046* (2013.01)

(56) References Cited

U.S. PATENT DOCUMENTS

| | | | |
|---|---|---|---|
| 2009/0322486 A1* | 12/2009 | Gerstel | B65G 1/1371 340/10.1 |
| 2014/0230472 A1* | 8/2014 | Coradetti | A01N 1/0242 62/125 |
| 2018/0075268 A1* | 3/2018 | Jun | G06K 7/10356 |
| 2022/0072533 A1* | 3/2022 | Davidowitz | B01L 3/5085 |

\* cited by examiner

SAMPLE STORAGE DEVICE

CROSS-REFERENCE TO RELATED APPLICATIONS

This is a continuation application of International Patent Application No. PCT/JP2020/004255 filed Feb. 5, 2020, which claims the benefit of priority to Japanese Patent Application No. 2019-062351 filed Mar. 28, 2019, the entire contents of each of which the entire contents of each of which are incorporated herein by reference.

BACKGROUND

Technical Field

The present disclosure relates to a sample storage device.

Description of the Related Art

First, a technique disclosed in the published Japanese Patent No. 5178746 will be outlined with the same reference numerals as those used therein in parentheses.

Rails (150) are provided on side portions of a plate-shaped base (148). The base (148) is guided in a front-rear direction through the rails (150). The base (148) has a plurality of antennas (152) arranged in a grid pattern. A rack (122) is placed on the base (148). A plurality of containers (140) are held in this rack (122) in a grid pattern. These containers (140) contain samples. Transponders (144), such as RFID tags, are provided at the bottoms of the containers (140). The transponders (144) store information about the samples.

With the technique disclosed in the published Japanese Patent No. 5178746, the containers (140) and the rack (122) placed on the base (148) are guided through the rails (150) along with the base (148). Incidentally, it is also desired that the base (148) and the antennas (152) provided to the base are fixed, and the rack (122) is guided through the rails. This enables the transponders (144) to be positioned above the respective antennas (152) by moving the rack (122) along the rails. In such a case, an increase in the thickness of the rails (150) to bear the weight of the rack (122) and the containers (140) increases the distance between the transponders (144) and the corresponding antennas (152). This may unable the transmission and reception of radio waves between the transponders (144) and the antennas (152).

The present disclosure is directed to efficient transmission and reception of radio waves between radio tags, such as transponders, and antennas.

SUMMARY

An aspect of the present disclosure is a sample storage device that may include: a storage chamber having an opening; paired rail sections separated from each other in a separating direction, and extending in an extending direction from the opening toward a depth of the storage chamber; an antenna array substrate extending between the paired rail sections, and positioned in a direction perpendicular to the separating direction and the extending direction with respect to the paired rail sections, the antenna array substrate having a plurality of antennas arranged in the extending direction and the separating direction; paired slide sections separated from each other in the separating direction, and positioned opposite to the antenna array substrate with respect to the paired rail sections, so as to be slidable in the extending direction relative to the paired rail sections, respectively; a support plate disposed to the paired slide sections so as to extend between the paired slide sections, the support plate being transparent to radio waves; and a storage box containable a plurality of containers each holding a sample and a radio tag, the storage box to be set on the support plate such that radio waves can be transmitted between the radio tag and corresponding one of the plurality of antennas.

DETAILED DESCRIPTION

At least following matters will become apparent from the descriptions of the present specification and the accompanying drawings.

Embodiment

With reference to the drawings, an embodiment of the present disclosure will be described. An embodiment described below is subject to various limitations that are technically desirable for implementing the present disclosure, but they do not limit the scope of the present disclosure to an embodiment described below and illustrated examples.

1. OVERVIEW OF SAMPLE STORAGE DEVICE

Figure 1:
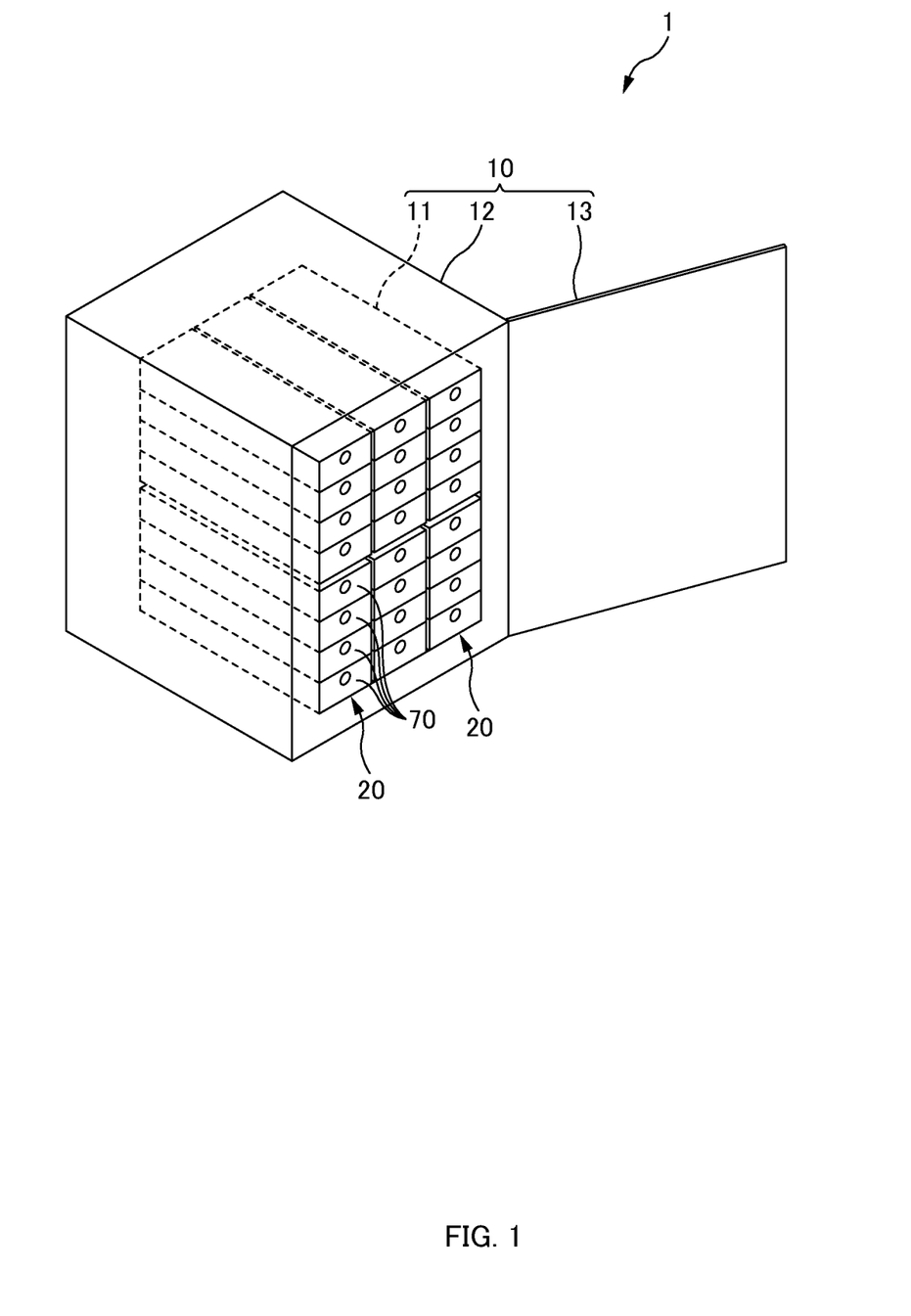
FIG. 1 is a perspective view of a sample storage device.

FIG. 1 is a perspective view of a sample storage device 1. In the following description, an "up-down direction" means a "vertical direction," but the "up-down direction" is not necessarily aligned with the "vertical direction."

This sample storage device 1 is a system for freezing and storing/managing samples (e.g., specimens such as blood, cells, or tissues obtained from a human body) and managing information about the samples.

The sample storage device 1 has a storage chamber 10 and a plurality of storage structures 20. These storage structures 20 are provided in the storage chamber 10 so as to be aligned in a width direction (lateral direction) and a height direction (up-down direction) in a grid pattern according to the size of the storage chamber 10. Note that the number of the storage structures 20 does not limit the scope of the present disclosure. For example, only one single storage structure 20 may be provided in the storage chamber 10.

2. STORAGE CHAMBER

The storage chamber 10 is a freezer, and the temperature in the storage chamber 10 is lowered to a predetermined temperature (e.g., −80° C.) by a cooling device (not illustrated). The storage chamber 10 has an inner box 11, an outer box 12, a heat-insulated door 13, and heat insulating material. Each of the inner box 11 and the outer box 12 is a rectangular parallelepiped and has a single opening. In an embodiment of the present disclosure, the inner box 11 and the outer box 12 are open on their front sides. The inner box 11 is mounted inside the outer box 12, and the space between the inner box 11 and the outer box 12 is filled with the heat insulating material (not illustrated). The heat-insulated door 13 is attached to the front of the outer box 12 at a side thereof with hinges. The heat-insulated door 13 opens and closes the front openings in the inner box 11 and the outer box 12.

3. STORAGE STRUCTURE

Figure 2:
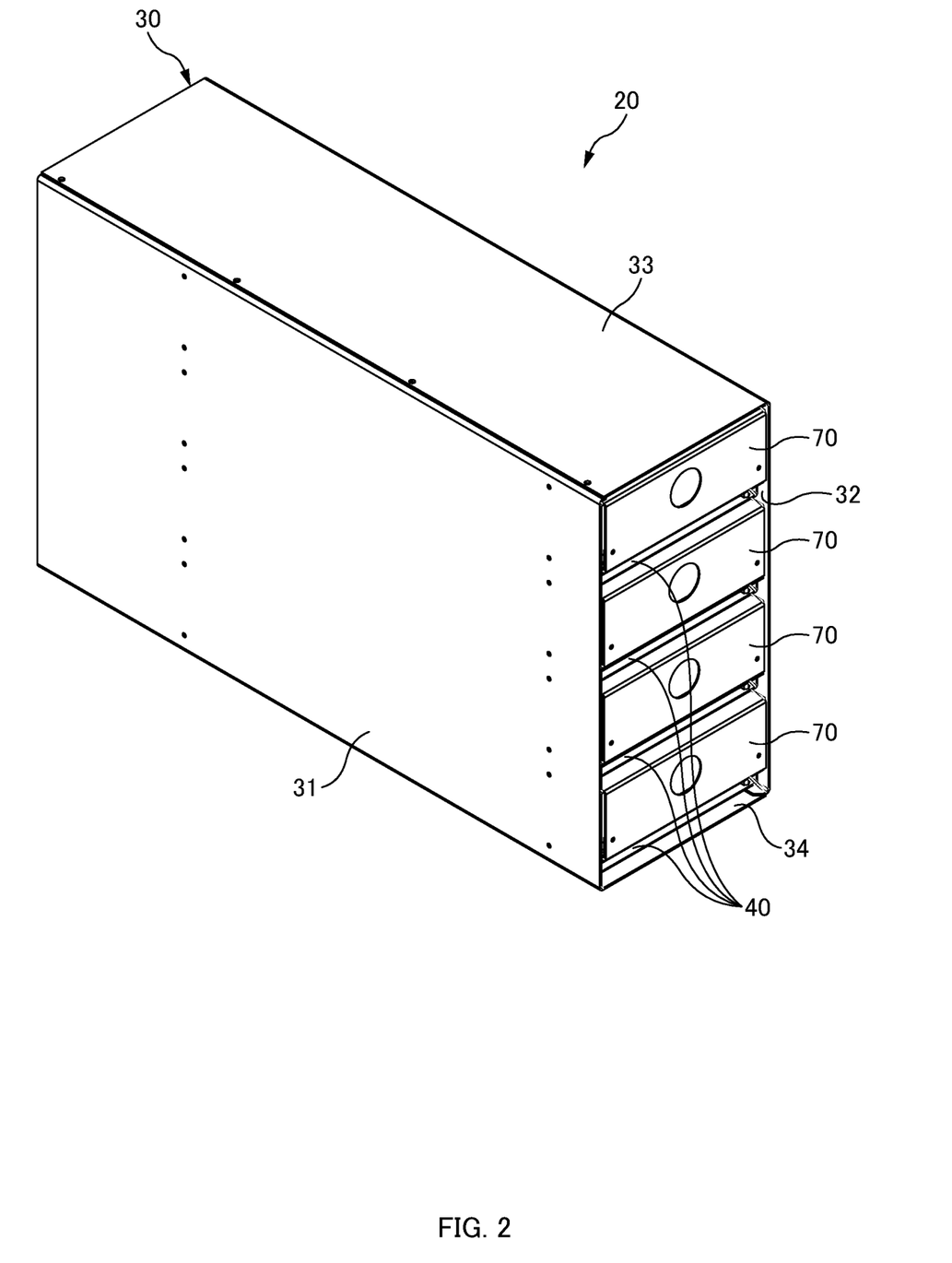
FIG. 2 is a perspective view of a storage structure.
Figure 3:
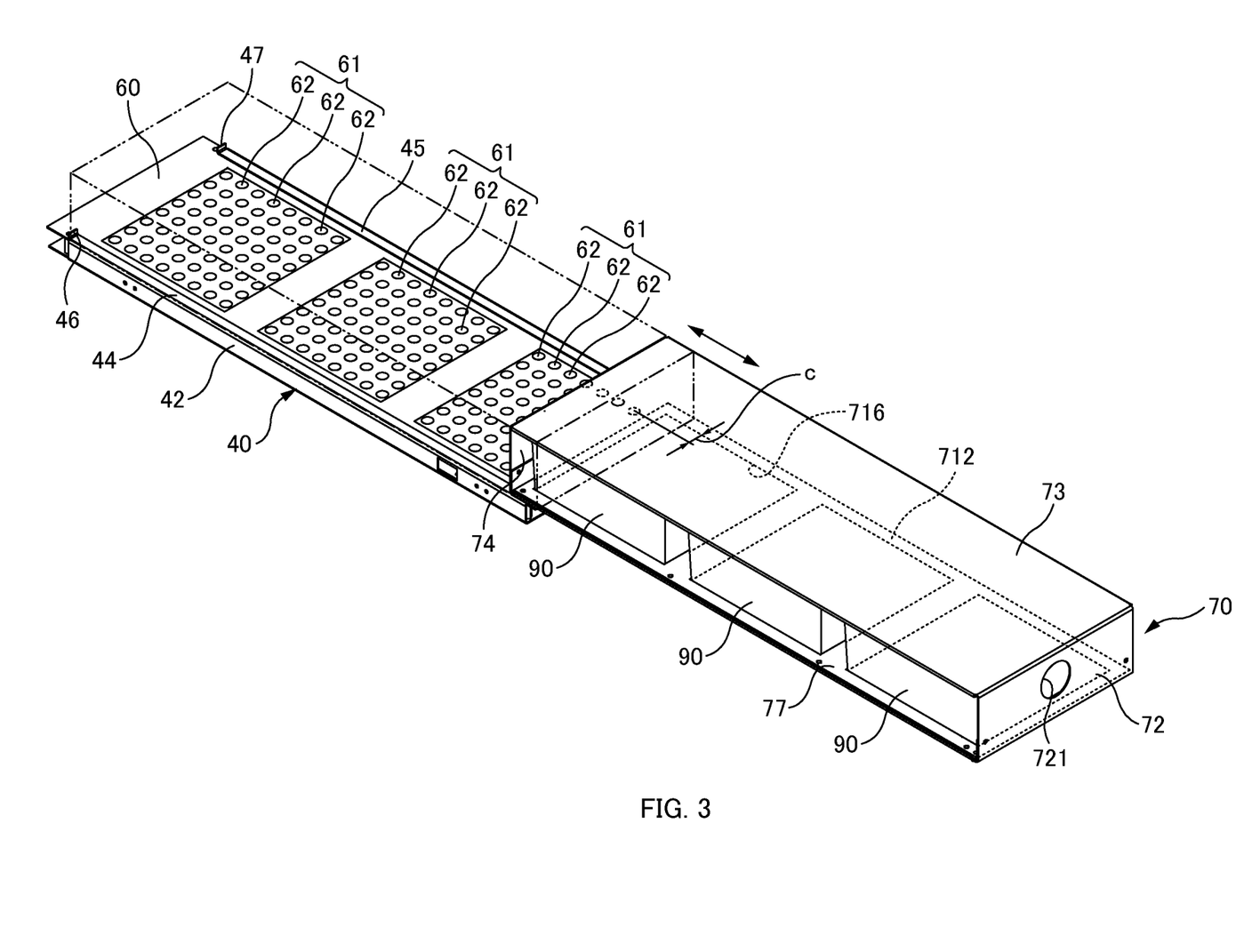
FIG. 3 is a perspective view of a set of a shelf member, an antenna array substrate, and a rack.

The storage structure 20 as illustrated in FIG. 2 is provided in the storage chamber 10, specifically, in the inner box 11. The storage structure 20 will be described below with reference to FIGS. 2 and 3. FIG. 2 is a perspective view of the storage structure 20, and FIG. 3 is a perspective view of a set of components for one of shelves of the storage structure 20.

The storage structure 20 has a housing 30, four shelf members 40, four antenna array substrates 60, and four slidable racks 70. The number of the shelf members 40, the number of the antenna array substrates 60, and the number of the racks 70 may also be one to three, or five or more.

<<<3-1. Housing>>>

The housing 30 has an opening on the same side as where the openings of the inner box 11 and the outer box 12 are formed. In an embodiment of the present disclosure, the housing 30 is a rectangular parallelepiped with an opening at its front, and has left and right side plates 31 and 32, an upper top plate 33, and a lower bottom plate 34. The side plates 31 and 32 stand at the left and right ends of the bottom plate 34, respectively. The top plate 33 extends between the upper end of the side plate 31 and the upper end of the side plate 32. The side plates 31 and 32 are parallel to each other, and the top plate 33 and the bottom plate 34 are parallel to each other. The front edges of the side plates 31 and 32, the front edge of the top plate 33, and the front edge of the bottom plate 34 are on the same plane, and the plane is perpendicular to the side plates 31 and 32, the top plate 33, and the bottom plate 34. In other words, each of the side plates 31 and 32, the top plate 33, and the bottom plate 34 is perpendicular to the front surface of housing 30, that is, a surface of the housing 30 with an opening. The side plates 31 and 32, the top plate 33, and the bottom plate 34 are formed as a single unit. The opening in the housing 30 is rectangular, and the sides of the opening defined by the side plates 31 and 32 are longer than the sides of the opening defined by the top plate 33 and the bottom plate 34. The side plates 31 and 32, the top plate 33, and the bottom plate 34 are made of metal such as an aluminum alloy, a stainless steel, and/or the like, and thus have electromagnetic shielding properties.

<<<3-2. Shelf Member>>>

The four shelf members 40 are attached to the side plates 31 and 32 at intervals in the up-down direction, so as to be parallel to the bottom plate 34 in the housing 30. In other words, the shelf members 40 are supported by the side plates 31 and 32 such that they are in parallel to the short sides of the opening of the housing 30, and extend from the opening toward the depth in a direction perpendicular to the short and long sides of the opening. Each of the shelf members 40 supports a rack 70 from below. The shelf members 40 are made of metal, such as an aluminum alloy, a stainless steel, and/or the like, and thus have electromagnetic shielding properties. Since the shelf members 40 are made of metal, they have a higher strength and rigidity even if they are thin, thereby being able to reduce deformation of the shelf members 40. Furthermore, the shelf members 40 are supported such that they are parallel to the short sides of the opening of the housing 30, thereby being able to reduce the distance between support points at which the weight of the shelf member 40 is supported. This can further reduce the deformation of the shelf members 40.

Figure 4:
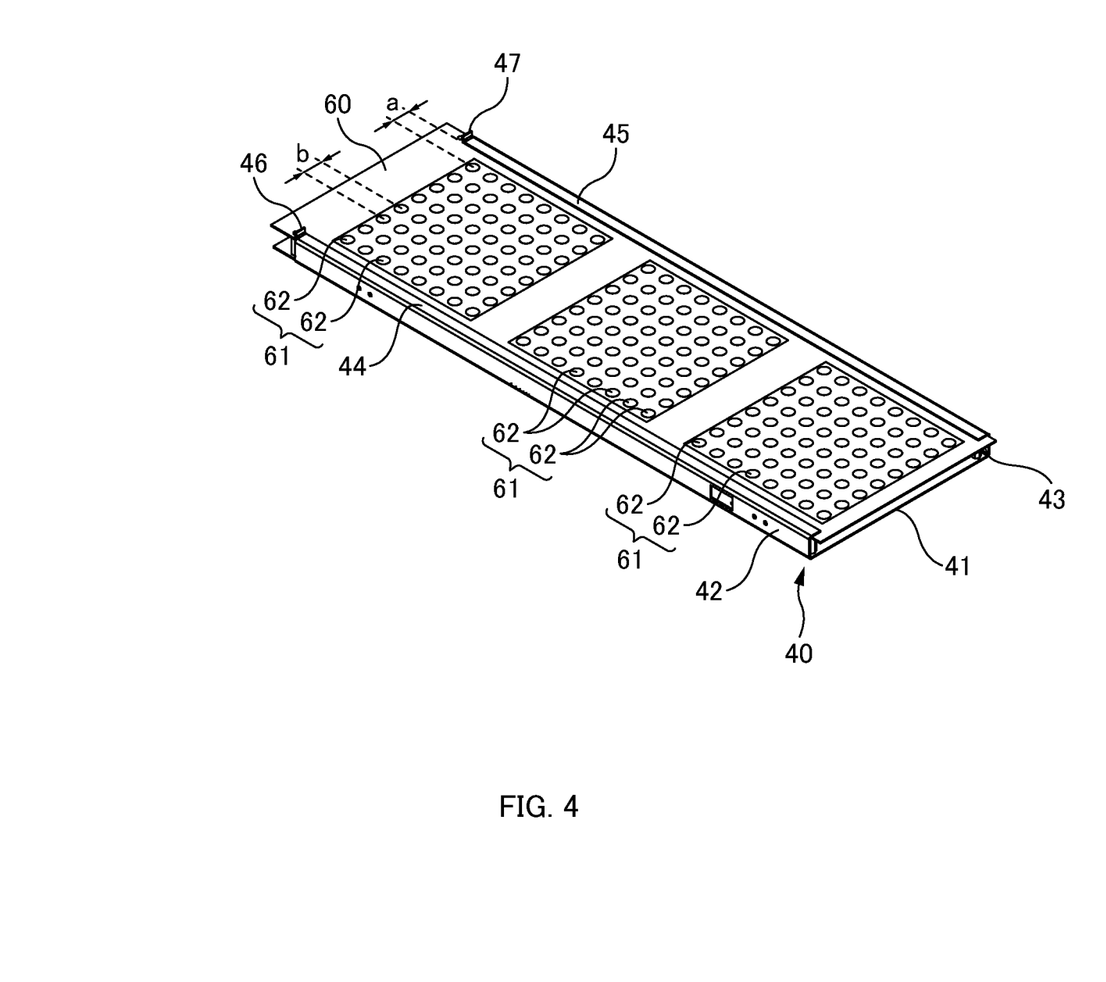
FIG. 4 is a perspective view of a shelf member and an antenna array substrate.
Figure 5:
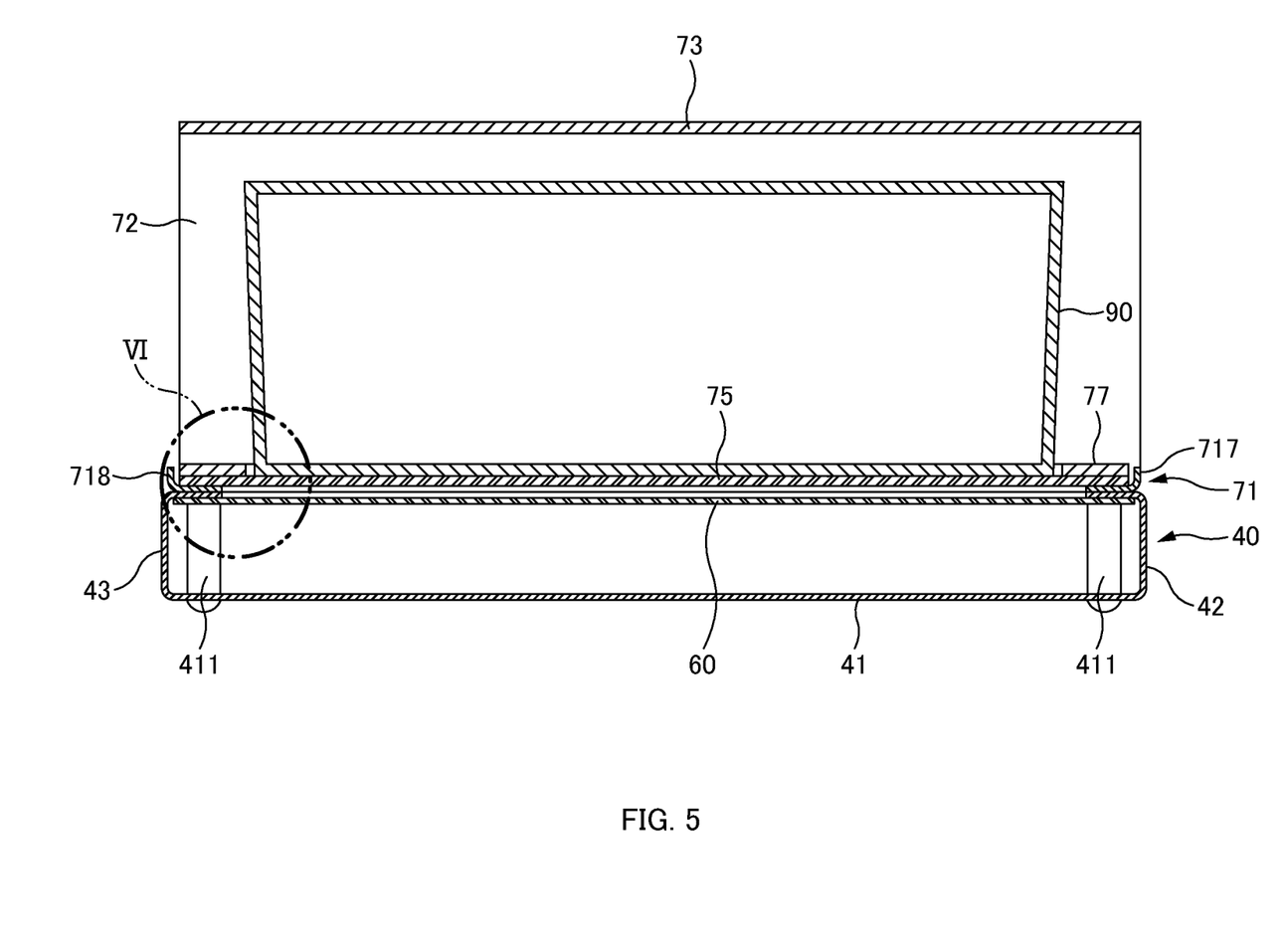
FIG. 5 is a cross-sectional view of the set illustrated in FIG. 3.
Figure 6:
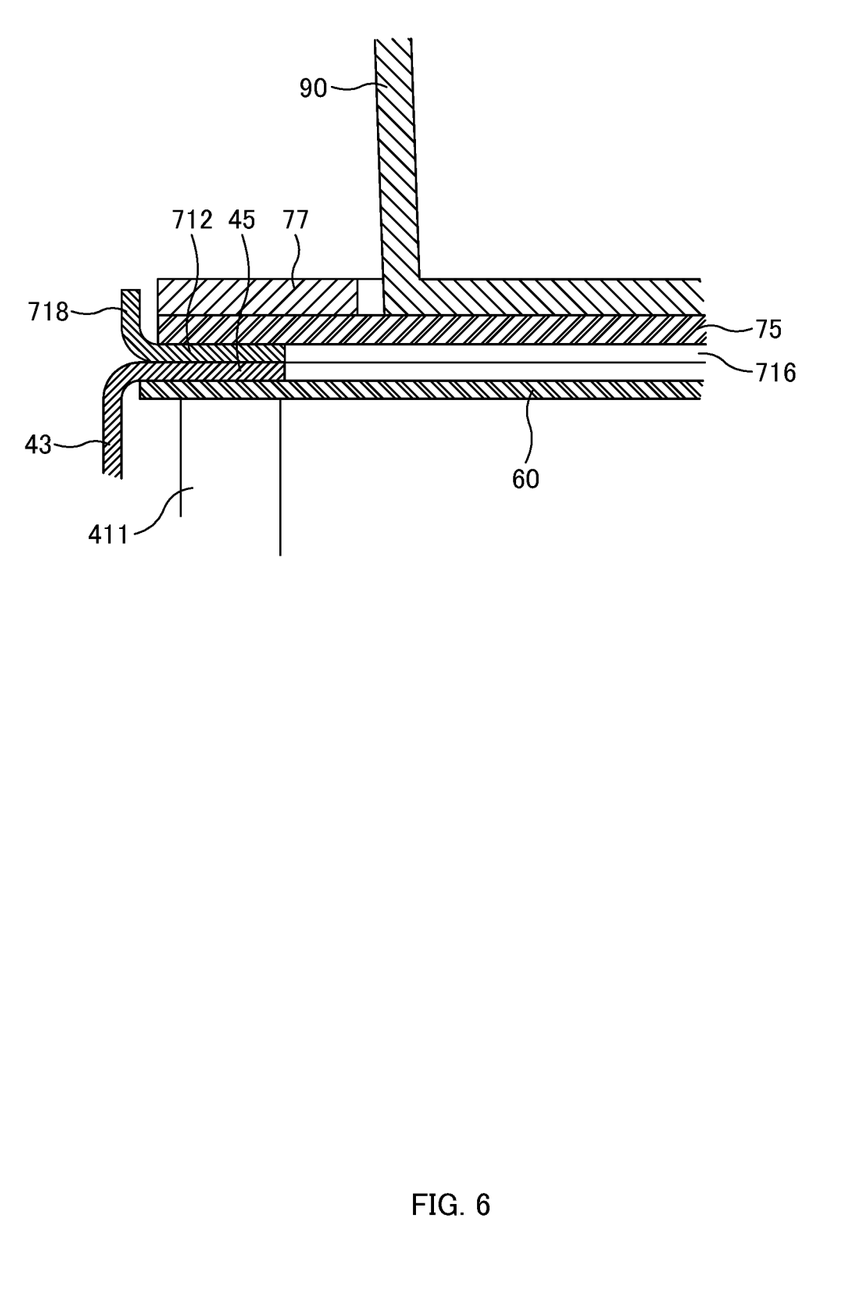
FIG. 6 is an enlarged view of an area VI in FIG. 5.

FIG. 4 is a perspective view of a shelf member 40 and an antenna array substrate 60. FIG. 5 is a cross-sectional view of a set of components illustrated in FIG. 3, and FIG. 6 is an enlarged view of an area VI in FIG. 5. The cross sections illustrated in FIGS. 5 and 6 are perpendicular to the direction in which the rack 70, which will be described later, slides.

As illustrated in FIGS. 4 to 6, the shelf member 40 has a base plate 41, a left side plate 42, a right side plate 43, a left rail section 44, a right rail section 45, a left stopper 46, and a right stopper 47. The base plate 41, the side plates 42 and 43, the rail sections 44 and 45, and the stoppers 46 and 47 are integrally molded.

The base plate 41 is formed in a rectangular shape.

The side plates 42 and 43 are provided to stand at the left and right edges of the base plate 41 by being bent up from the left and right edges of the base plate 41, respectively. The side plates 42 and 43 are fixed to the side plates 31 and 32, respectively, of the housing 30 with screws and/or the like.

The rail section 44 is bent to the right from the upper end of the side plate 42 and is positioned above the base plate 41 with a space therefrom. The rail section 44 has a strip shape with its longitudinal direction along a front-rear direction, extending in the front-rear direction along the left side plate 31 of the housing 30. The rail section 45 is bent to the left of the side plate 43 and is positioned above the base plate 41 with a space therefrom. The rail section 45 has a strip shape with its longitudinal axis along the front-rear direction, extending in the front-rear direction along the right side plate 32 of the housing 30. In other words, the rail sections 44 and 45 extend perpendicular to the open surface of the housing 30. The rail sections 44 and 45 are spaced apart from each other in the lateral direction with a gap therebetween. The direction in which the rail sections 44 and 45 are separated from each other ("separating direction") is perpendicular to the direction along which the rail sections 44 and 45 extend ("extending direction"). The separating direction is aligned with the lateral direction, and the extending direction is aligned with the front-rear direction. The direction perpendicular to the separating direction and the extending direction is aligned with the up-down direction. The rack 70 is placed on the rail sections 44 and 45 and is guided forward and rearward through the rail sections 44 and 45.

The stoppers 46 and 47 are provided in a state of standing at the rear ends of the rail sections 44 and 45, respectively. Upon the rear end of the rack 70 contacting the stoppers 46 and 47, the rearward movement of the rack 70 is restricted.

<<<3-3. Antenna Array Substrate>>>

The antenna array substrate 60 is attached to the shelf member 40 at a position between the base plate 41 and the rail sections 44 and 45. The antenna array substrate 60 and the rail sections 44 and 45 are adjacent to each other with a short distance between the antenna array substrate 60 and the rail sections 44 and 45. Specifically, spacers 411 are attached to the base plate 41, and the antenna array substrate 60 is mounted on these spacers 411. The antenna array substrate 60 is thus adjacent to the rail sections 44 and 45 with a distance to the rail sections 44 and 45 being shortened. The antenna array substrate 60 is parallel to the rail sections 44 and 45. The spacers 411 serve to keep a distance between the base plate 41 and the antenna array substrate 60 constant, and a distance between the top surface of the antenna array substrate 60 and the top surfaces of the rail sections 44 and 45 constant. As a result, the distance between the antenna array substrate 60 and the top surfaces of the rail sections 44 and 45 is defined only by the thickness of the rail sections 44 and 45 and the distance between the antenna array substrate 60 and the rail sections 44 and 45. Thus, the distance between the antenna array substrate 60 and the top surfaces of the rail sections 44 and 45 can be stably kept short regardless of a state of assembly.

Note that the antenna array substrate 60 and the rail sections 44 and 45 may contact each other, with the antenna array substrate 60 being pressed against the rail sections 44 and 45 by virtue of the spacers 411.

As used herein, the term "contact" refers to a state in which components contact each other without any gap. The term "adjacent" encompasses "contact" and refers to a state in which components are adjacent to each other with a small gap of about 2 mm or less.

Three antenna arrays 61 are formed on the antenna array substrate 60. Each of the antenna arrays 61 has a plurality of antennas 62 that are equally spaced apart from each other and arranged in a grid pattern along the surface of the antenna array substrate 60. The surface of the antenna array substrate 60 extends in the lateral direction and the front-rear direction. Accordingly, these antennas 62 are arranged in the lateral direction and the front-rear direction. Each of the antennas 62 is connected through wiring to a reading/writing device (not illustrated) outside the storage chamber 10.

The upper side of these three antenna arrays 61 is open with a space between the rail sections 44 and 45. In other words, the rail sections 44 and 45, which are metal components, are located outside the antenna arrays 61 at a predetermined distance or more. Specifically, in FIG. 4, the dimension "a [mm]" is equal to or larger than a half of the dimension "b [mm]", where the dimension "a [mm]" is a distance between the center of an antenna 62 in a row that is closest to one of the rail sections 44 and 45 in the antenna arrays 61 and one end of the corresponding one of the rail sections 44 and 45 facing the antenna arrays 61, and the dimension "b [mm]" is a distance between the centers of the antennas 62 immediately adjacent to each other in the antennas 62 that are equally spaced apart from each other. Setting the distance "a" to be equal to or larger than a half of the distance "b" prevents the communications from being blocked, even in antennas 62 in the rows closest to the rail sections 44 and 45 respectively, although the intensity of radio waves slightly decreases due to the presence of the metal components.

Furthermore, with the distance "a" being set to be approximately equal to or larger than the distance "b," communications comparable to those of antennas 62 positioned on the inner side in the antenna arrays 61 can be achieved without being affected by the metals. This makes it possible to further stabilize the communications of all antennas in the antenna arrays 61. Whereas, an increase in the distance "a" increases the size of the shelf members 40. It is thus desirable that the distance "a" be equal to or larger than a half of the distance "b" and smaller than or equal to the distance "b".

<<<3-4. Rack>>>

The rack 70 is placed in the housing 30 such that either one surface is adjacent to the rail sections 44 and 45 of the shelf member 40. The rack 70 is restricted in its movement, by the rail sections 44 and 45 of the corresponding shelf member 40 forming a set with this rack 70; the side plates 31 and 32; and the top plate 33 or the base plate 41 of the shelf member 40 in another set. Thus, the rack 70 is slidable, in the direction perpendicular to the open surface of the housing 30, relative to the shelf member 40, with a distance from the shelf member 40 being maintained, and the rack 70 is removable through the opening of the housing 30.

In an embodiment of the present disclosure, the rack 70 is placed on the shelf member 40 in the housing 30 and contacts the shelf member 40 by virtue of gravity. The rack 70 is slidable in the front-rear direction relative to the shelf member 40 on the shelf member 40, and is removable from the housing 30 toward the front. With the rack 70 and the shelf member 40 contacting each other by virtue of gravity, the distance between the rack 70 and the rail sections 44 and 45 of the shelf member 40 can always be kept zero regardless of a state of assembly or operation.

Figure 8:
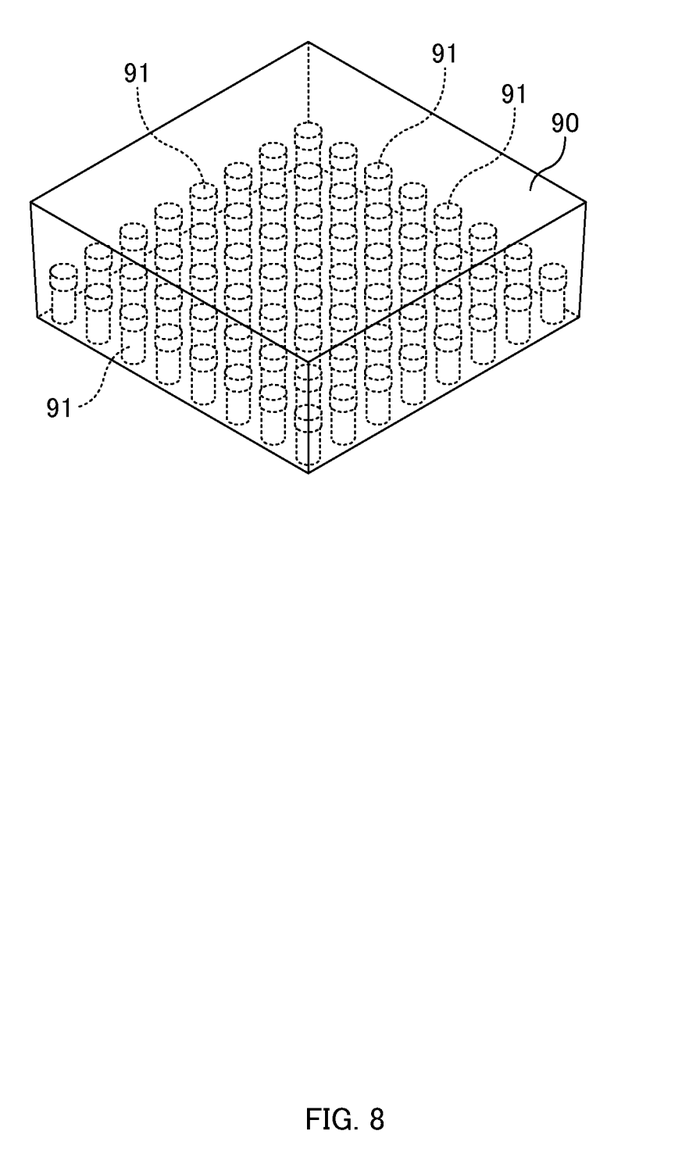
FIG. 8 is a perspective view of a storage box to be held in the rack.

The rack 70 is to house three storage boxes 90 such that they are arranged in the front-rear direction. As illustrated in FIG. 8, each of the storage boxes 90 has a plurality of storage recesses (not illustrated) arranged in a grid pattern. Each of the storage recesses receives a container 91 in an upright position.

Figure 9:
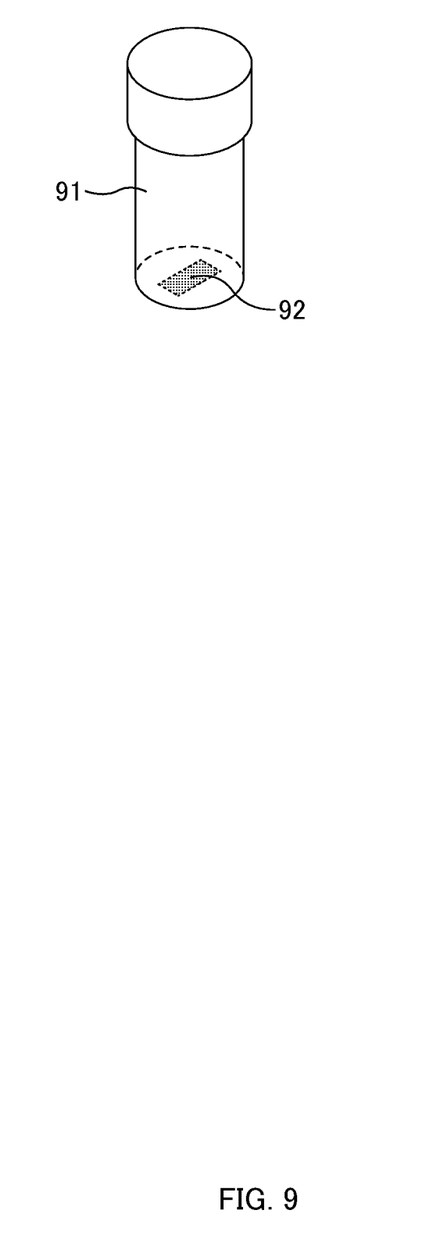
FIG. 9 is a perspective view of a container to be held in the storage box.

As illustrated in FIG. 9, a radio frequency identifier (RFID) radio tag 92 is attached to the bottom of each container 91. The radio tag 92 stores unique identification information. The radio tag 92 also stores information about the sample held in the container 91 (e.g., when and where it was collected, name, age, gender, shelf life for storage, etc.), in association with the unique identification information. Alternatively, a separate database may be provided which links the unique identification information of the radio tag 92 to the information about the sample held in the container 91.

Figure 7:
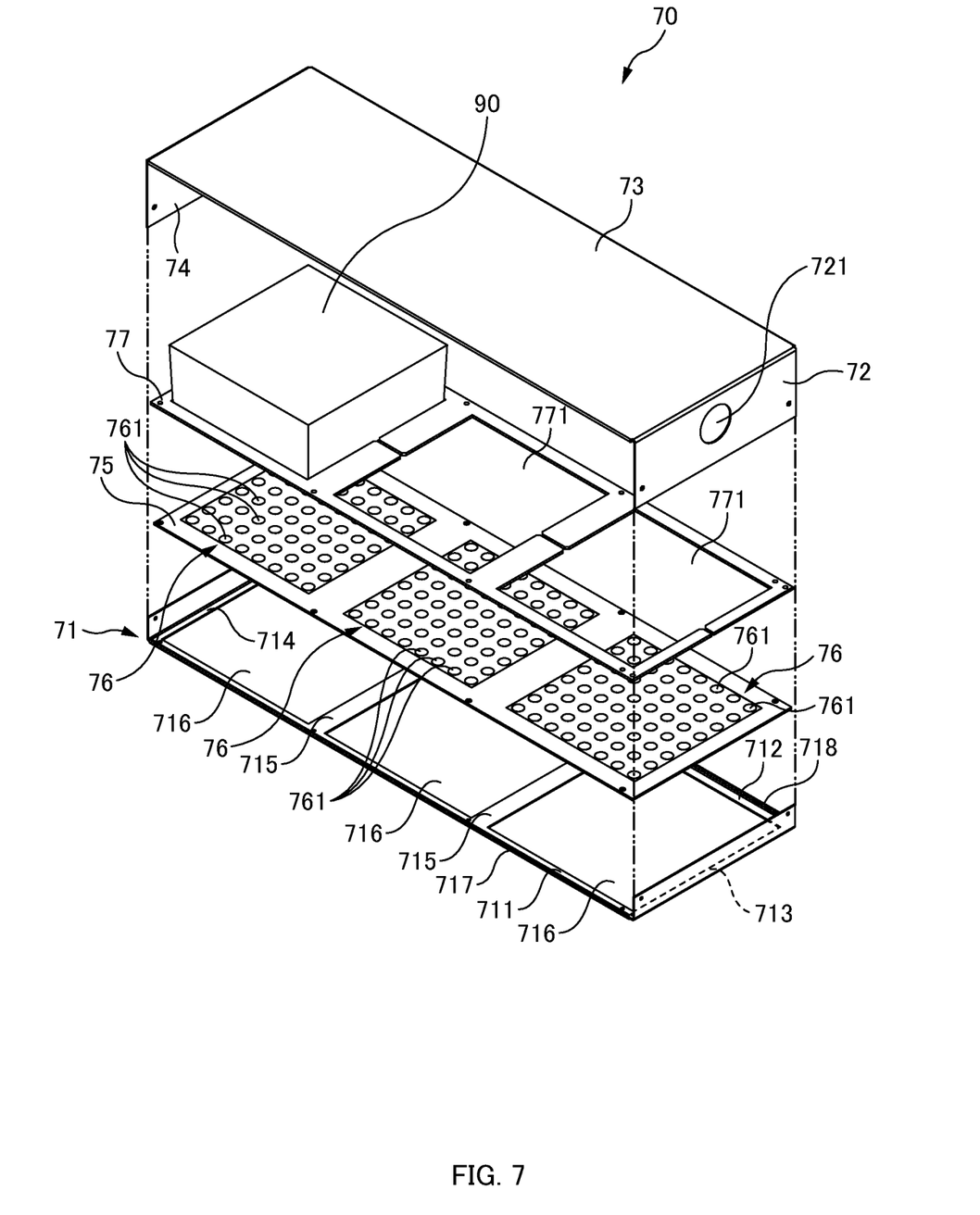
FIG. 7 is an exploded perspective view of the rack.

FIG. 7 is an exploded perspective view of the rack 70. As illustrated in FIGS. 3, 5, 6, and 7, the rack 70 has a slider 71, a front plate (first plate) 72, a rear plate (second plate) 74, a top plate (third plate) 73, a support plate 75, a plurality of (here, three) waveguide arrays 76, and a positioning frame 77.

The slider 71 is made of metal, such as an aluminum alloy and/or a stainless steel, and thus has electromagnetic shielding properties. Since the slider 71 is made of metal, even a thinner slider 71 has a higher strength and rigidity.

The slider 71 has paired left and right slide sections 711 and 712, paired front and rear beam sections, which are a front beam section (first beam section) 713 and a rear beam section (second beam section) 714, a plurality of (here, two) crosspiece sections 715, and paired left and right flanges 717 and 718. Each of the slide sections 711 and 712 has a strip shape. The slide sections 711 and 712 are parallel to each other and extend in the front-rear direction. The slide sections 711 and 712 are separated from each other in the lateral direction. The front beam section 713 extends between the front edge of the slide section 711 and the front edge of the slide section 712. The rear beam section 714 extends between the rear edge of the slide section 711 and the rear edge of the slide section 712. The crosspiece sections 715 extend between the slide sections 711 and 712. The slide sections 711 and 712, the front beam section 713, and the rear beam section 714 are integrally molded into a rectangular frame. The space inside the rectangular frame is divided into three by the crosspiece sections 715, thereby forming three slider openings 716 in the slider 71. The number of the crosspiece sections 715 is not limited to two, but may be also one, three, or more than three. It should be noted, however, that the number of the slider openings 716 defined by the crosspiece sections 715 is equal to or smaller than the number of the antenna arrays 61 and the number of the waveguide arrays 76 which will be described later.

In an embodiment of the present disclosure, such bridge sections that extend between the rail sections 44 and 45 or between the slide sections 711 and 712 which are spaced apart from each other in the lateral direction in the shelf member 40 and the rack 70 are only the front beam section 713, the rear beam section 714, and the crosspiece sections 715, which are provided only in the rack 70. The provision of the bridge sections only on the side of the rack 70 where the storage boxes 90 are held can avoid such deterioration of operability caused by resistance when bridge sections contacting each other during sliding as well as increase the rigidity of the rack 70 that supports a large weight.

The flange 717 is bent up from the left edge of the slide section 711 and stands at the left edge of the slide section 711. This flange 717 improves the rigidity of the slide section 711, thereby reducing the bending deformation of the slide section 711. Similarly, the flange 718, which improves the rigidity of the slide section 712, stands at the right edge of the slide section 712.

The slider 71 as described above is placed on the shelf member 40 and is slidable in the front-rear direction relative to the shelf member 40. Specifically, the slide section 711 is to be at a position opposite to the antenna array substrate 60 with respect to the rail section 44, and the slide section 711 is slidably placed on the rail section 44. The slide section 712 is to be at a position opposite to the antenna array substrate 60 with respect to the rail section 45, and the slide section 712 is slidably placed on the rail section 45. Upon the rear ends of the slide sections 711, 712 of the slider 71 contacting the stoppers 46 and 47, respectively, the rearward movement of the slider 71 is restricted. The movement in the lateral direction of the slider 71 is restricted by the side plates 31 and 32 of the housing 30.

The top plate 73 has a rectangular shape. At the front end of the top plate 73, the front plate 72 is provided to hang down, and at the rear end of the top plate 73, the rear plate 74 is provided to hang down. The front plate 72, the top plate 73, and the rear plate 74 are integrally molded. The front plate 72, the top plate 73, and the rear plate 74 are made of metal such as an aluminum alloy and/or a stainless steel, and thus have electromagnetic shielding properties.

The lower end of the front plate 72 is fixed to the front end of the front beam section 713, and the lower end of the rear plate 74 is fixed to the rear end of the rear beam section 714. The front plate 72 and the rear plate 74 are provided to stand on the upper surface of the slider 71, and the top plate 73 is spaced apart from the slider 71 upward. The space surrounded by the front plate 72, the top plate 73, the rear plate 74, and the slider 71 is open on the left and right sides of the rack 70. Users can insert and remove the storage boxes 90 through such openings.

The front plate 72 has a hole 721 for grabbing. A user can insert his or her finger(s) or the like into the hole 721 and hold the front plate 72 to move the rack 70 in the front-rear direction.

On the slider 71, the support plate 75 having a rectangular plate shape is provided. Specifically, the left end of the support plate 75 is attached onto the slide section 711 of the slider 71, and the right end of the support plate 75 is attached onto the slide section 712 of the slider 71. The support plate 75 extends between the slide sections 711 and 712 along the lateral direction. In addition, the front end of the support plate 75 is attached onto the front beam section 713 of the slider 71, and the rear end of the support plate 75 is attached onto the rear beam section 714 of the slider 71. The support plate 75 extends between the front beam section 713 and the rear beam section 714 along the front-rear direction. The support plate 75 is reinforced by the slider 71 (in particular, the slide sections 711 and 712, the front beam section 713, the rear beam section 714, and the crosspiece sections 715).

The movements of the support plate 75 in the lateral direction is restricted by the flanges 717 and 718, and the forward and rearward movements of the support plate 75 is restricted by the front plate 72 and the rear plate 74. Thus, the support plate 75 is positioned relative to the slider 71.

The support plate 75 is made of resin and is transparent to radio waves.

The three waveguide arrays 76 are formed in the support plate 75. Each of the waveguide arrays 76 has a plurality of waveguides 761 arranged in a grid pattern along the surface of the support plate 75. The waveguides 761 are, for example, such a metal foil pattern having a line width and line length that radio waves propagating between the radio tags 92 and the corresponding antennas 62 resonate at the corresponding waveguides 761. The waveguides 761 on each of the waveguide arrays 76 arranged in a grid pattern to be equally spaced apart from each other, similarly to the antennas 62 in each of the antenna arrays 61.

On the support plate 75, the positioning frame 77 having a thin plate shape is placed. The positioning frame 77 has three rectangular positioning openings 771 formed to be arranged in the front-rear direction. The waveguide arrays 76 are placed inside the edge of the positioning opening 771, and the waveguides 761 of each of the waveguide arrays 76 are arranged in a grid pattern inside the edge of the positioning opening 771. The lower part of each of the storage boxes 90 is fitted into the positioning opening 771 and placed on the support plate 75. This determines the positions of the storage boxes 90 relative to the support plate 75. The containers 91 in the storage boxes 90 are positioned directly above the corresponding waveguides 761, respectively, and the radio tags 92 are positioned directly above the corresponding waveguides 761, respectively. The slider opening 716 is larger than the positioning opening 771.

Here, in the rack 70, the storage box 90 is placed on the support plate 75 that is disposed on the slider 71, so as to be surrounded by the positioning opening 771. In other words, the distance from the end surface of the rack 70 on the side of the antenna arrays 61 to the storage box 90, and in turn, to the radio tags 92 is determined only by the thickness of the slider 71 and the support plate 75 of the rack 70. With this configuration, the distance between the end surface of the rack 70 on the side of the antenna arrays 61 and the radio tags 92 can stably be kept short regardless of a state of assembly.

Also, as mentioned above, in an embodiment of the present disclosure, the shelf member 40 is configured such that the antenna array substrate 60 and the rail sections 44 and 45 are adjacent to each other at a short distance; and the rail sections 44 and 45 are adjacent to the slider 71 in the rack 70, and the rack 70 is configured such that the slider 71 and the support plate 75 are adjacent to each other. This enables the distance between antenna arrays 61 and radio tags 92 to be defined by the thicknesses of the materials thereof, and thus variations among devices caused by assembly, such as an error in mounting position and/or the like, are unlikely to occur. Accordingly, the distance between the antenna arrays 61 and the radio tags 92 can stably be kept short without variations, regardless of a state of assembly. Since variations in the distance between the antenna arrays 61 and the radio tags 92 are directly related to variations in the intensity of wireless communication, more stable communication can be carried out by virtue of stabilization of the distance.

In a state where the rear ends of the slide sections 711 and 712 of the slider 71 contact the stoppers 46 and 47, respectively, the containers 91 and the corresponding radio tags 92 are positioned directly above the antennas 62, respectively, across the support plate 75 that is transparent to radio waves. Thus, radio waves are transmitted and received between the radio tags 92 and the antennas 62, thereby enabling a reader/writer to read the information stored in the radio tags 92 through short-range wireless communication and to write various types of information through short-range wireless communication. This makes it possible to manage the containers 91 and the samples, and to check the storage locations of the containers 91. Furthermore, with the waveguide arrays 76 being formed on the support plate 75, the containers 91, the corresponding radio tags 92, and the corresponding waveguides 761 are positioned directly above the antennas 62, and thus the radio waves between the radio tags 92 and the antennas 62 are enhanced with the waveguides 761. In addition, with the waveguide arrays 76 being formed on the support plate 75 constituting the rack 70 that is slidable relative to the shelf member 40, in other words, with the waveguide arrays 76 being formed on the movable side, the waveguide arrays 76 can be formed without adding new components between the antennas 62 and the radio tags 92, that is, without increasing the distance between the antennas 62 and the radio tags 92. This enables even more stable communication.

In the state where the rear ends of the sliding sections 711 and 712 of the slider 71 contact the stoppers 46 and 47, respectively, the space between the antenna arrays 61 and the support plate 75 is open by virtue of the space between the rail sections 44 and 45 and the spaces of the slider openings 716. In other words, the ends of the slider openings 716, which are metal components, are located outside the antenna arrays 61 by a predetermined distance or more. Specifically, in FIG. 3, the dimension "c [mm]" is equal to or larger than a half of the dimension "b [mm]." The dimension "c [mm]" is a distance between an antenna 62 in the antenna arrays 61 in a row that is closest to an edge of a slider opening 716 and the edge of the slider opening 716.

Accordingly, the inner edges of the slide sections 711 and 712, the front beam section 713, the rear beam section 714, and the crosspiece sections 715 that surround the slider openings 716 are spaced apart, by a distance "c," from the center of an antenna 62 in the antenna arrays 61 in a row that is closest to an edge of a slider opening 716. This prevents the communications from being blocked even antennas 62 in the antenna arrays 61 in each row that is closest to a corresponding edge of the slider openings 716, although the intensity of radio waves slightly decreases due to the presence of the metal components.

Furthermore, by setting the distance "c" to approximately the distance "b" or greater, communications comparable to those of inner antennas 62 in the antenna arrays 61 can be achieved without being affected by metal. This makes it possible to further stabilize the communications of all the antennas in the antenna arrays 61. Meanwhile, an increase in the distance "c" increases the size of the rack 70. It is thus desirable that the distance "c" be equal to or larger than a half of the distance "b" but equal to or smaller than the distance "b" itself.

In an embodiment of the present disclosure, the distance "a"=the distance "c"=the distance "b" is satisfied. This allows the outermost antennas 62 of each of the antenna arrays 61 to communicate equivalently or similarly to the inner antennas, and also allows all the waveguides 761 in each of the waveguide arrays 76 to have the same characteristics.

It should be noted that a configuration may be made such that the distance "a"=the distance "c"=(the distance "b"×½) is achieved and only the characteristics of the outermost waveguides 761 in each of the waveguide arrays 76 are enhanced. This is for the purpose of compensating for a reduction in the intensity of radio waves at an outermost part of each of the antenna arrays 61, caused by a reduction in the distances "a" and "c", by improving the characteristics of the outermost waveguides 761. In this way, while the storage structure 20 is downsized, the intensity of the radio waves between the radio tags 92 and the antennas 62 can be maintained, thereby being able to perform stable communications.

Furthermore, since the edges of the slider openings 716 are located outside the antenna arrays 61 by a predetermined distance or more, the slider openings 716 are larger than the positioning openings 771, as described above. Accordingly, for example, in the state where the rear ends of the slide sections 711 and 712 of the slider 71 contact the stoppers 46 and 47, respectively, the entire positioning openings 771 are positioned inside the edges of the slider openings 716, respectively.

The structure of the storage structure 20 is defined with reference to the side on which the housing 30 is open. In an embodiment of the present disclosure, each of the openings in the storage chamber 10, the inner box 11, the outer box 12, the storage structure 20, and the housing 30 is directed in a direction crossing the vertical direction, in particular, forward, but may also be directed upward in the vertical direction.

4. ADVANTAGEOUS EFFECTS (1) With the rack 70 being pulled out, the storage boxes 90 can be put into and removed from the rack 70. In particular, it is easy to put the storage box(es) 90 into the rear of the rack 70 and take out the storage box(es) 90 from the rear of the rack 70.

(2) The positions of the containers 91 and the radio tags 92 relative to the storage box(es) 90 are determined by placing the containers 91 in the storage recesses in the storage box(es) 90. When the storage box(es) 90 are placed in the rack 70, the positions of the storage box(es) 90, the containers 91 and the radio tags 92 relative to the support plate 75 are determined by the positioning frame 77. When the rack 70 is moved rearward on the shelf member 40, the positions of the rack 70, the containers 91, and the radio tags 92 relative to the antenna array substrate 60 are determined by the stoppers 46 and 47. Thus, the radio tags 92 can be positioned directly above the corresponding antennas 62, with one-to-one correspondence between the radio tags 92 and the antennas 62.

(3) Since the support plate 75 is reinforced by the slider 71 having strength and rigidity, the support plate 75 can be made thinner. A reduction in thickness of the support plate 75 contributes to a reduction in the distance from the radio tags 92 to the corresponding antennas 62. Accordingly, radio waves are efficiently transmitted between the radio tags 92 and the corresponding antennas 62.

(4) Since the slider 71 and the shelf member 40 are made of metal, the slide sections 711 and 712 of the slider 71 and the rail sections 44 and 45 of the shelf member 40 can be made thinner. Accordingly, the distance from the radio tags 92 to the corresponding antennas 62 can be reduced, and radio waves can be easily transmitted and received between the radio tags 92 and the corresponding antennas 62.

(5) The slide sections 711 and 712 are spaced apart from each other, and the rail sections 44 and 45 are spaced apart from each other. Thus, even when the slide sections 711 and 712 and the rail sections 44 and 45 have electromagnetic shielding properties, the transmission and reception of radio waves between the radio tags 92 and the corresponding antennas 62 are not blocked by the slide sections 711 and 712 and the rail sections 44 and 45.

(6) The front beam section 713, the rear beam section 714, and the crosspiece sections 715 extend between the slide sections 711 and 712, and thus the slider 71 has a higher rigidity. Since the support plate 75 is reinforced by such slider 71, the support plate 75 can be made thinner. Accordingly, it is possible to prevent the propagation of radio waves between the radio tags 92 and the antennas 62 from being inhibited by the support plate 75.

(7) Since the waveguides 761 are placed between the radio tags 92 and the antennas 62, respectively, the gain of transmission and reception of radio waves between the radio tags 92 and the antennas 62 is high.

(8) The support plate 75 can be used for both placing the storage box(es) 90 and installing the waveguides 761. This eliminates the need to separately provide a space and member for installing the waveguides 761.

(9) The waveguides 761 are provided on the support plate 75 on which the storage boxes 90 are to be placed, and thus the provision of the waveguides 761 does not increase the distance between the radio tags 92 and the antennas 62. In addition, while the storage boxes 90 are removed from the top of the support plate 75, the waveguides 761 can be handled, adjusted, cleaned, and defrosted, for example.

(10) The front plate 72, the top plate 73, and the rear plate 74 reinforce the slider 71 and contribute to maintaining the overall shape of the rack 70. Thus, the rack 70 is easy to handle.

(11) The front plate 72 stands at the front end of the slider 71, and thus when the rack 70 is pushed in, the front plate 72 partially closes the front opening of the inner box 11. When all the racks 70 are pushed in, the front plates 72 of these racks 70 almost entirely close the opening on the front side of the inner box 11. Thus, when the insulated door 13 is opened, the cold air inside the inner box 11 is trapped inside the inner box 11. This can suppress a sudden rise in temperature inside the inner box 11.

According to an embodiment of the present disclosure, the rail sections and the slide sections do not interfere with the transmission and reception of radio waves between the radio tags and the antennas. The support plate transparent to radio waves is reinforced by the slide sections, and the support plate can thus be made thinner. Accordingly, the transmission and reception of radio waves between the radio tags and the antennas are not interfered with by the support plate.

What is claimed is:

1. A sample storage device comprising:
   a storage chamber having an opening;
   a shelf member fixed to the storage chamber and including:
      paired rail sections separated from each other in a separating direction, and extending in an extending direction from the opening toward a depth of the storage chamber; and
      an antenna array substrate extending between the paired rail sections, and positioned in a direction perpendicular to the separating direction and the extending direction with respect to the paired rail sections, the antenna array substrate having a plurality of antennas arranged in the extending direction and the separating direction; and
   a slidable rack including:
      paired slide sections separated from each other in the separating direction, and positioned opposite to the antenna array substrate with respect to the paired rail sections, the paired slide section being slidable in the extending direction relative to the paired rail sections, respectively;
      a support plate disposed to the paired slide sections and extending between the paired slide sections, the support plate being transparent to radio waves; and
      a storage box containable a plurality of containers each holding a sample and a radio tag, the storage box being set on the support plate, wherein:
   radio waves are transmitted between the radio tag and corresponding one of the plurality of antennas, and
   the slidable rack is slidable into and out from the storage chamber through the opening.

2. The sample storage device according to claim 1, wherein:
   the slidable rack further includes a plurality of waveguides that are disposed to the support plate and arranged in the extending direction and the separating direction, and
   the waveguides cause radio waves transmitted and received between the plurality of radio tags and the plurality of antennas, to resonate.

3. The sample storage device according to claim 1, wherein the slidable rack further includes paired flange sections that respectively stand at the paired slide sections to reinforce the paired slide sections, respectively.

4. The sample storage device according to claim 1, wherein:
   the slidable rack further includes a positioning frame disposed to the support plate, the positioning frame having a shape of a frame, and
   the storage box is positioned by being fitted inside the positioning frame.

5. The sample storage device according to claim 1, wherein:
   each of the paired slide sections has a first end portion and a second end portion, and
   the slidable rack further includes:
      a first beam section extending between the first end portions;
      a second beam section extending between the second end portions;
      a first plate stands at the first beam section;
      a second plate stands at the second beam section; and
      a third plate disposed between the first plate and the second plate, and being spaced apart from the slide section.

* * * * *